Nov. 24, 1964 W. W. WILLHOEFT ETAL 3,158,412
AIR BEARING

Filed Oct. 16, 1962 2 Sheets-Sheet 1

INVENTORS.
WALTER W. WILLHOEFT
ARTHUR H. MANKIN
By Albert Henry
ATTORNEY

Nov. 24, 1964          W. W. WILLHOEFT ETAL          3,158,412
                            AIR BEARING
Filed Oct. 16, 1962                              2 Sheets-Sheet 2
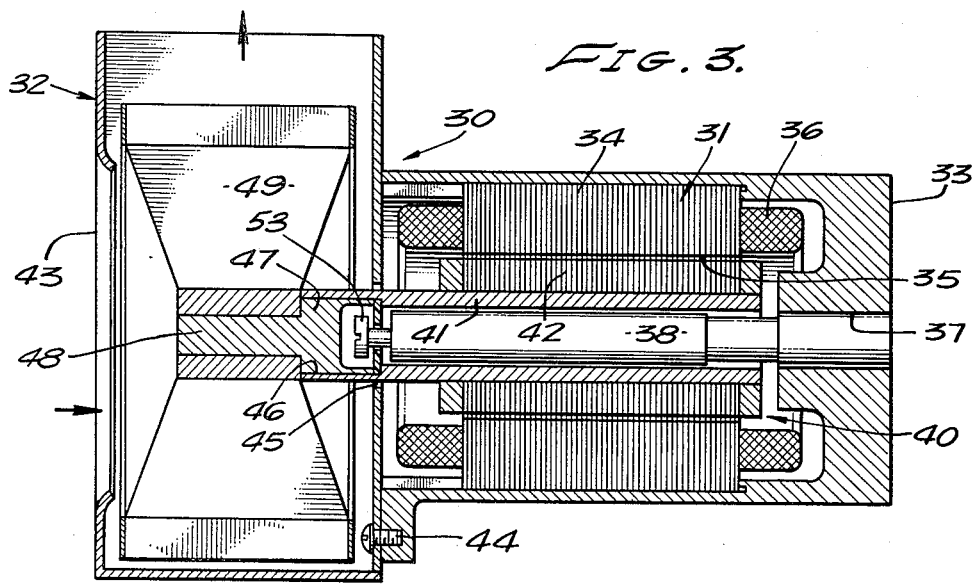
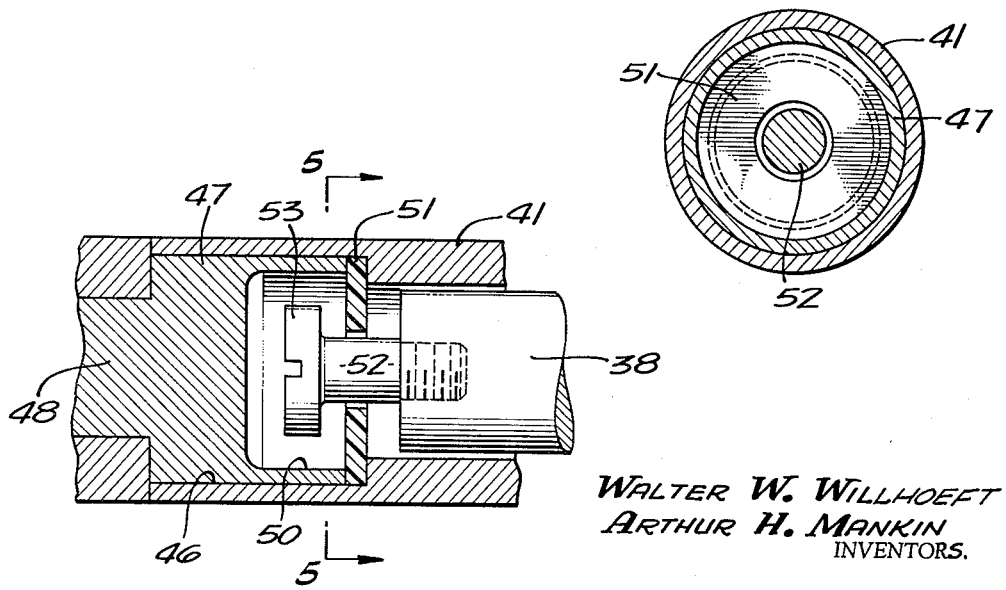
WALTER W. WILLHOEFT
ARTHUR H. MANKIN
          INVENTORS.
BY Albert Merzig
ATTORNEY

United States Patent Office 3,158,412
Patented Nov. 24, 1964

3,158,412
AIR BEARING
Walter W. Willhoeft, Jamaica, and Arthur H. Mankin, Huntington, N.Y., assignors to IMC Magnetics Corp.
Filed Oct. 16, 1962, Ser. No. 230,840
4 Claims. (Cl. 308—9)

This invention relates to electro-dynamic machinery and more especially to bearings of dynamo-electric machines having a rotor supported on an air or gas film.

In the rotating machinery art and particularly the dynamo electric art wherein the driving element is a rotor it has been found that the rotor can be totally supported on a bearing surface comprising a thin film of fluid such as air or a gas and that no other lubricant is necessary. In order to operate satisfactorily in this manner certain conditions must be met, one of which is that the confronting bearing surfaces of the parts must have extremely fine finishes and accurate geometric tolerances. Another condition is that the total confronting bearing surfaces must be large enough to sustain the weight or load of the rotor.

In the operation of dynamo-electric apparatus of this character, there may be one or more forces of axial thrust on the rotor which must be counterbalanced, such forces commonly being shock, vibration, as well as other transient forces. Such transient forces may find their origin in the apparatus being driven, such as a varying load on a driven generator or fan which are typical of such transient axial forces. The axial thrust forces may be most common in one direction in any particular machine drive, however, they may be in either direction and the counterbalancing means must be effective in both directions.

It is therefore the general purpose and objective of this invention to provide a novel and improved mechanism of the dynamo-electric type and incorporating a rotor carried solely on a gas or air film whereby axial stability of the rotor is provided for.

A more particular object of the invention is to provide a machine having non-contacting rotor and stator parts including a chamber in communication with the fluid film supporting the rotor on the stator shaft, in which chamber there is an element for effecting axial stability of the rotor, in both axial directions thereof, the said element preferably being in the form of a baffle member which acts against trapped air in both axial directions.

A further object of the invention is to embody the above-mentioned features for operation with the axis of rotation, either horizontal or vertical, in any class of dynamo electric equipment such as motors, generators, converters and combinations thereof, such as motor generator sets and turbo generators.

Another object of the invention is to provide improvements as stated above in rotary machine apparatus capable of counterbalancing transient axially directed loads which transient may originate in fan or impeller blades or other driven element.

With the foregoing objects in mind other objects and advantages of the invention will become apparent and be brought out more fully in the following specification, reference being had to the accompanying drawings.

In the drawings:

FIGURE 3 is a view similar to FIGURE 1, showing the present invention of a modified form incorporated in a motor driven blower unit.

FIGURE 4 is a partial view, enlarged, and in section of the same.

FIGURE 5 is a section view taken along line 5—5 of FIGURE 4.

Figure 1:
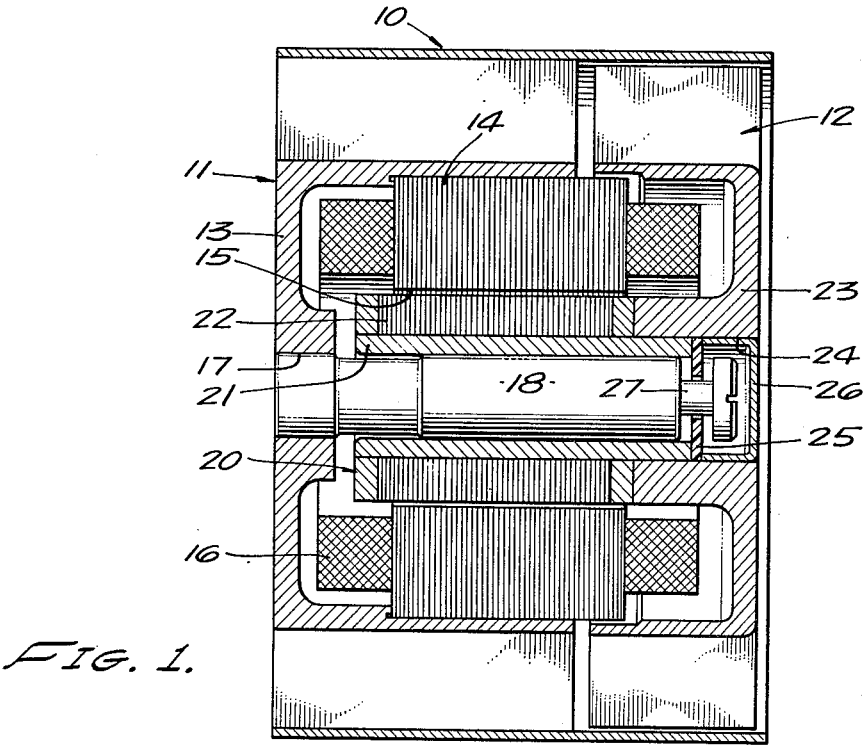
FIGURE 1 is a view in longitudinal section of an induction motor and fan unit incorporating the present invention.
Figure 2:
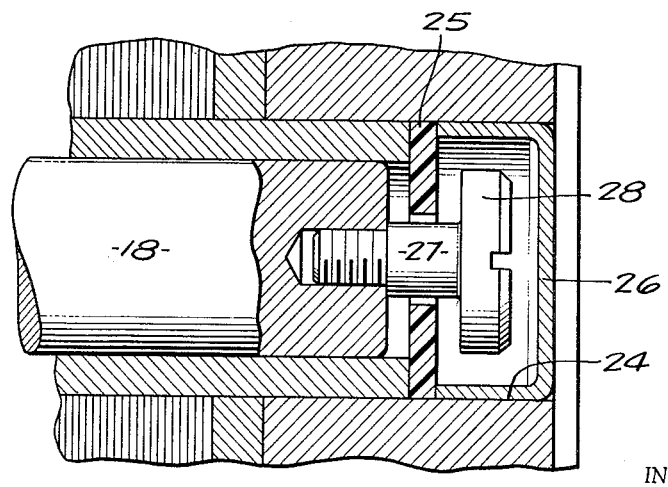
FIGURE 2 is an enlarged partial view in section of the same.

Referring more particularly to FIGURES 1 and 2 of the drawings there is there shown an electro-dynamic device 10, being a motor driven fan, the numeral 11 indicating an induction motor and the numeral 12 a fan. Motor 11 has a frame 13 which mounts a stator core 14 in the usual laminated form which has a central opening or bore 15. A stator field winding 16 surrounds core 14. Frame 13 has a bore 17 in which one end of a bearing pin 18 is seated by a press or equivalent fit.

The numeral 20 indicates in general a rotor or armature which is dimensioned to be received in bore 15 of the stator 14 and comprises a sleeve 21 which is carried by the bearing pin 18 in a manner to be more fully described hereinafter. The rotor lamination is indicated at 22. Fan 12 is carried by a hub 23 which has a bore 24 by which it is suitably secured on one end of sleeve 21 as by press or key fit for unitary rotation with the armature 20.

A washer 25 of any suitable material, but preferably of Teflon is suitably secured in hub bore 24 and is held against the end of sleeve 21 by a retaining cup 26 positioned in bore 24. A screw 27 extends axially from the end of bearing pin 18 and has a flanged head 28 within the retainer cup 26, the screw being extended through washer 25.

FIGURES 3 to 5 inclusive show the present invention incorporated in an electro-dynamic device 30, being a motor driven blower unit the numeral 31 indicating an induction motor and the numeral 32 a blower. Motor 31 is comprised of a frame 33 enclosing and mounting a stator core 34 having bore or opening 35 and a field winding 36. Motor frame 33 has a bore 37 to receive one end of a bearing pin 38 which is suitably secured therein.

The numeral 40 indicates the rotor or armature having a bearing sleeve 41 on which the armature laminations 42 are positioned. A blower housing 43 is secured to frame 33 as by screws 44 and has a wall opening 45 through which bearing sleeve 41 extends.

Bearing sleeve 41 has a counterbore 46 in which is received the end of the stub shaft 47 which is secured therein by a press or key fit, the stub shaft having a reduced diameter end portion 48 on which the impeller 49 of the blower 32 is secured. Stub shaft 47 has a blind bore 50, and a Teflon or equivalent washer 51 is positioned and held in counterbore 46 by the end of the stub shaft 47. A screw 52 extends through washer 51 and is secured in the end of bearing pin 38 and has a flanged head 53 within blind bore 50 which forms a compression chamber.

Referring again to FIGURES 1 and 2, it will be seen that rotor 20 is rotatable on bearing pin 18, the bore of sleeve 21 having a slight clearance with respect thereto, the radial clearance between the confronting surfaces, when they are concentric, being within a range of 0.000050 to 0.003 inch per inch of diameter. This clearance space is filled with the ambient fluid which may be a gas, however, air is satisfactory. The gas or air in this clearance space is in communication with the chamber formed by retaining cup 26 and washer 25 in which chamber the flanged head 28 of screw 27 is positioned. The film of air surrounding bearing pin 18 during the rotation of the rotor is load-carrying, having pressure characteristics which are sufficient to support the rotor and blower or air moving device. Thus no conventional lubricant is necessary since the parts are actually out of physical contact.

The air in the chamber provided by a retainer cup 26 and washer 25 is trapped in the cavity and this trapped air will resist any axial movement of the rotor which may be caused by any of the forces described above. This resistance is effective in either direction. The resistance to movement is effective for the reason that any axial shifting of the rotor will cause the air in the chamber to be compressed or expanded. In view of this unique construction and operation no exact tolerances are required other than those of the air or gas film between the sleeve 21 and bearing pin 18.

In the embodiment shown in FIGURES 3 to 6, the action is substantially similar to that of the embodiment of FIGURES 1 and 2, the principle difference being in the mounting of the impeller blades 49 on a stub shaft end 48, and the fluid chamber formed by blind bore 50 and washer 51.

As may be observed therefore, the invention provides a single simplified means for absorbing the axial thrust in either direction, which is effective, yet occupies a minimum of space.

While I have shown and described herein preferred forms which the invention may take it will be understood that this is by way of exemplification and not of limitation of the invention which is to be afforded the full scope of the appended claims.

What is claimed is:

1. In a machine having a rotor having a central bore therein, a cylindrical bearing member in the bore of the rotor with a fluid film between the cylindrical member and the rotor, means forming an enclosure at one end of said cylindrical member having communication with said film and providing a cavity, a disc-shaped member in said cavity and a stem of smaller diameter extending between said disc-shaped member and said cylindrical member whereby relative axial movement between the rotor and the cylindrical member in either direction is inhibited by action of the surfaces of said disc member on the fluid in said cavity.

2. In a machine having a rotor having a central bore therein, a cylindrical bearing member in the bore of the rotor with a fluid film between the cylindrical member and the rotor, means forming an enclosure at one end of said cylindrical member having communication with said film and providing a cavity, a disc-shaped member in said cavity and a stem of smaller diameter extending between said disc-shaped member and said cylindrical member and a barrier member in said enclosure at the end of said cylindrical member having a central opening of larger diameter than said stem and having said stem extending through it so that said opening provides for communication of said film to said cavity, whereby relative axial movement between the rotor and the cylindrical member in either direction is inhibited by action of the surfaces of said disc member on the air in said cavity.

3. A dynamo-electric machine comprising a rotor having a bore having a cylindrical tubular sleeve in the bore, a cylindrical member positioned in said sleeve and there being a fluid film between the surfaces of the bore and the cylindrical member, means forming an enclosure at one end of said sleeve providing a fluid cavity, a disc member in said cavity and a stem of smaller diameter extending between said disc member and the end of said cylindrical member whereby in the event of relative axial movement between the sleeve and the cylindrical member in either direction the disc member acts against the fluid in said cavity and inhibits the said relative axial movement.

4. The combination as in claim 3, including a barrier member having a central opening therein near one end of said sleeve, the central opening being larger in diameter than said stem and the said stem extending through said opening providing for communication between said film and the said cavity through said opening.

References Cited in the file of this patent
UNITED STATES PATENTS

| | | |
|---|---|---|
| 1,690,425 | Norton | Nov. 6, 1928 |
| 2,535,454 | Rawlins | Dec. 26, 1950 |
| 2,928,960 | Macks | Mar. 15, 1960 |